Dec. 13, 1960     H. L. HYDE     2,963,787
DEVICE FOR RULING GAGE LINES
Filed Aug. 27, 1958

INVENTOR.
HUBERT L. HYDE
BY Donald G. Dalton
ATTORNEY

United States Patent Office 2,963,787
Patented Dec. 13, 1960

2,963,787

DEVICE FOR RULING GAGE LINES

Hubert L. Hyde, McKeesport, Pa., assignor to United States Steel Corporation, a corporation of New Jersey Filed Aug. 27, 1958, Ser. No. 757,623

2 Claims. (Cl. 33—42)

This invention relates to a device for ruling gage lines on the underside of a plate or the like.

The device has particular application in the manufacture of electric-weld large diameter steel pipe, where it is used for ruling gage lines on the inside of a plate which has been formed into a nearly closed circular shape preliminary to the welding operation. The usual practice is to apply an external weld within the gap between the edges of the plate and subsequently an internal weld. There is no particular problem in properly locating the external weld, but it is difficult to locate the internal weld exactly in the gap opposite the external weld. The present invention affords a simple device for ruling parallel gage lines on the inner surface a fixed distance on each side of the gap. The internal weld then can be located parallel with these lines and exactly midway therebetween, thus facilitating locating the weld accurately. Nevertheless, it is apparent the device may have other applications, and the invention is not thus limited.

An object of the invention is to provide a ruling device of simple construction adapted to apply gage lines to the underside of a plate parallel to the edge and a predetermined distance therefrom.

A further object is to provide a device of the foregoing type which applies a clear sharp line to a plate without smudging.

A more specific object is to provide a ruling device which includes a frame, rollers journaled to the frame to guide its movement along a plate edge, a reservoir for quick-drying lacquer or equivalent marking fluid, and a marking wheel journaled in the reservoir to apply lacquer to a line along the underside of a plate.

Figure 1:
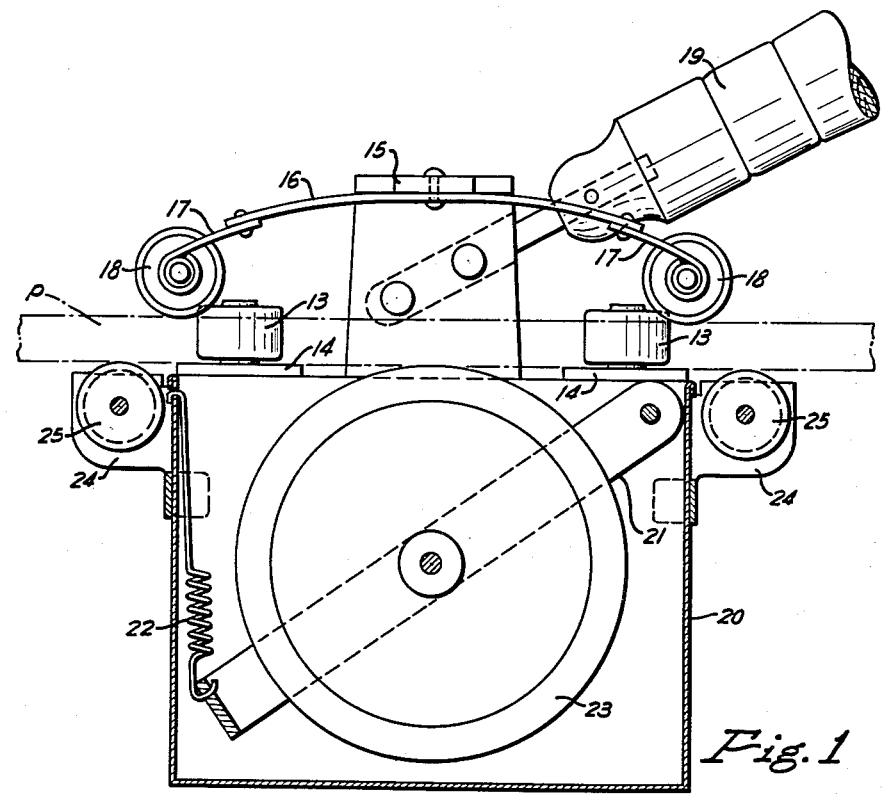
Figure 2:
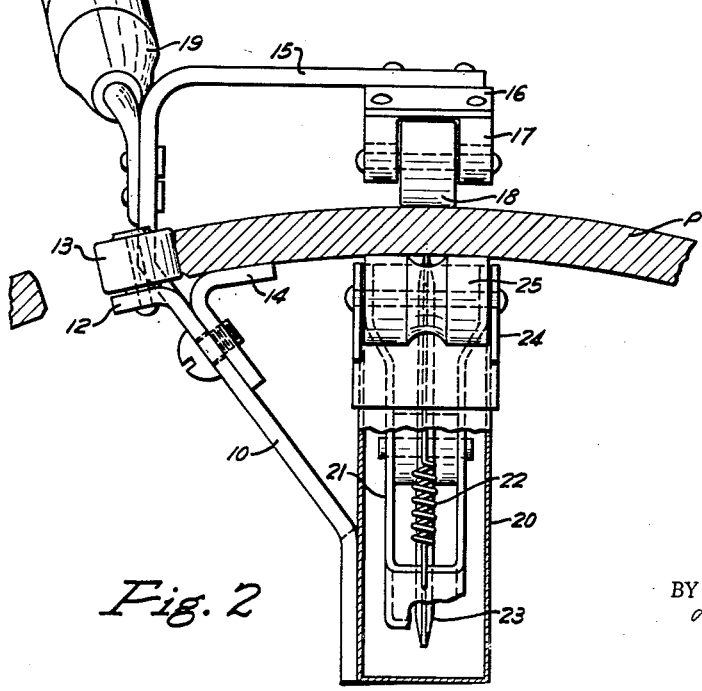

In accomplishing these and other objects of the invention, I have provided improved details of structure, a preferred form of which is shown in the accompanying drawing, in which:

Figure 1 is a side elevational view, with parts broken away, of my ruling device; and Figure 2 is an end elevational view, with parts broken away, showing the device mounted on a plate for marking.

The device includes a frame member 10, preferably formed of a single bent strip of metal. A pair of outwardly projecting integral ears 12 are formed at the intermediate portion of the frame, and a pair of spaced guide rollers 13 are journaled to these ears to turn on substantially vertical axes. A pair of plate flanges 14 bent to acute angles are fixed to the frame opposite the ears. A horizontal portion 15 is formed at the upper end of the frame and on its underside carries a leaf spring 16. The ends of this spring carry bearing members 17 to which rollers 18 are journaled to turn on substantially horizontal axes. A handle 19 is fixed to the frame between the ears 12 and horizontal portion 15.

The lower end of frame 10 carries an open-topped lacquer reservoir 20. A diagonal lever 21 of U-shape in plan is pivoted within the reservoir adjacent one of the upper corners. A tension spring 22 is connected between the free end of lever 21 and the other upper corner of the reservoir and thus urges the lever upwardly. A marking wheel 23 is journaled to the mid-portion of the lever. The wheel has a sharp circumferential edge, and preferably is steel. The outside end faces of the reservoir carry brackets 24 adjacent the top. Circumferentially grooved rollers 25 are journaled to brackets 24 to turn on substantially horizontal axes.

Figure 2 shows my ruling device positioned on a plate P which has been bent to a nearly closed circular shape for welding to form a pipe. The vertical rollers 13 ride along the flat surface at the edge of the plate, and the horizontal rollers 18 and 25 ride along the upper and lower surfaces respectively of the plate in the area where the mark is to be applied. The flanges 14 engage the under surface of the plate to assist in steadying the device. The spring 22 pulls the marking wheel 23 upwardly so that its circumferential edge bears firmly against the underside of the plate. The wheel dips into the lacquer or other marking fluid in the reservoir 20. Thus as the device travels along the edge of the plate, the wheel applies a clear sharp gage line to the underside of the plate. The grooves in rollers 25 are aligned with the edge of the marking wheel, whereby these rollers do not smudge the line.

Since the horizontal distance between the rollers 13 and the marking wheel is fixed, the wheel rules a line on the under surface of the plate a fixed distance from the edge of the plate and parallel thereto. Before the plate is formed, the edges are squared off; consequently the line is straight throughout its length. Thereafter the device is transferred to the opposite edge of the plate, where another similar line is ruled. After the external weld is applied, the two lines can be used to gage the internal weld.

While I have shown and described only a single embodiment of the invention, it is apparent that other modifications may arise. Therefore, I do not wish to be limited to the disclosure set forth but only by the scope of the appended claims.

I claim:

1. A device for ruling gage lines on the underside of a plate comprising a frame, spaced rollers journaled to said frame and adapted to ride along the edge of the plate, a leaf spring carried by the upper portion of said frame, rollers journaled to said spring and adapted to ride along the upper surface of the plate, a reservoir fixed to the lower portion of said frame and adapted to contain marking fluid, circumferentially grooved rollers journaled with respect to the outside end faces of said reservoir and adapted to ride along the underside of the plate, a lever pivoted within said reservoir, a marking wheel journaled to said lever and having a sharp circumferential edge, and spring means urging said lever upwardly where the circumferential edge of said wheel can contact the underside of the plate, the grooves in said grooved rollers being aligned with said wheel, whereby the rollers avoid smudging marks made by the wheel.

2. A device for ruling gage lines on the underside of a plate comprising a frame, spaced rollers journaled to said frame and adapted to ride along the edge of the plate, resilient means carried by the upper portion of said frame, rollers journaled to said resilient means and adapted to ride along the upper surface of the plate, a reservoir fixed to the lower portion of said frame and adapted to contain marking fluid, circumferentially grooved rollers journaled with respect to the outside end faces of said reservoir and adapted to ride along the underside of the plate, a lever pivoted within said reservoir, a marking wheel journaled to said lever and having a sharp circumferential edge, and spring means urging said lever upwardly where the circumferential edge of said wheel can contact the underside of the plate, the grooves in said grooved rollers being aligned with said wheel, whereby the rollers avoid smudging marks made by wheel.

References Cited in the file of this patent
UNITED STATES PATENTS

| | | |
|---|---|---|
| 849,777 | Freestate | Apr. 9, 1907 |
| 886,804 | Herman | May 5, 1908 |
| 1,340,218 | Ellis | May 18, 1920 |
| 2,007,396 | Howard | July 9, 1935 |
| 2,401,576 | Mason | June 4, 1946 |